(12) United States Patent
Yang et al.

(10) Patent No.: US 9,654,157 B2
(45) Date of Patent: May 16, 2017

(54) LINK ADAPTATION METHOD AND DEVICE

(71) Applicant: Huawei Technologies Co., Ltd., Shenzhen, Guangdong (CN)

(72) Inventors: Jianjun Yang, Chengdu (CN); Linfeng Xia, Chengdu (CN); Weimin Chen, Chengdu (CN); Yun Liu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/135,187

(22) Filed: Apr. 21, 2016

(65) Prior Publication Data

US 2016/0241279 A1    Aug. 18, 2016

Related U.S. Application Data

(63) Continuation of application No. PCT/CN2014/082161, filed on Jul. 14, 2014.

(30) Foreign Application Priority Data

Oct. 22, 2013   (CN) .......................... 2013 1 0499691

(51) Int. Cl.
*H04B 17/00* (2015.01)
*H04B 1/04* (2006.01)
(Continued)

(52) U.S. Cl.
CPC ......... *H04B 1/0475* (2013.01); *H01Q 1/1257* (2013.01); *H04B 17/318* (2015.01); *H04B 17/336* (2015.01)

(58) Field of Classification Search
CPC .... H04B 1/0475; H04B 1/1027; H04B 17/24; H04B 17/309; H04B 17/318; H04B 17/336
(Continued)

(56) References Cited

U.S. PATENT DOCUMENTS 6,819,927 B1 *  11/2004  Sato ..................... H04B 1/7075
                                                  375/E1.003
8,644,771 B1 *   2/2014  Delker .................. H04W 52/48
                                                  370/318

(Continued)

FOREIGN PATENT DOCUMENTS

CN        1656647 A        8/2005
CN        1735998 A        2/2006
(Continued)

*Primary Examiner* — Simon Nguyen

(57) ABSTRACT

The present invention relates to the field of communications, and provides a link adaptation method and device, so as to determine, according to transmission quality of a signal in a link, to perform antenna alignment and/or frequency adjustment. The method includes: detecting, by a first antenna device, an RSSI of a link between the first antenna device and a second antenna device; when it is determined that the RSSI is greater than or equal to a first RSSI threshold, detecting, by the first antenna device, an SINR of the link; and choosing, by the first antenna device according to the RSSI and the SINR, to perform frequency adjustment and/or antenna alignment with the second antenna device. Embodiments of the present invention are applied to link adaptation.

14 Claims, 4 Drawing Sheets

```
┌─────────────────────────────────────────────────────┐
│ A first antenna device detects an RSSI of a link    │── S101
│ between the first antenna device and a second       │
│ antenna device                                      │
└─────────────────────────────────────────────────────┘
                          ▼
┌─────────────────────────────────────────────────────┐
│ When it is determined that the RSSI is greater than │── S102
│ or equal to a first RSSI threshold, the first       │
│ antenna device detects an SINR of the link          │
└─────────────────────────────────────────────────────┘
                          ▼
┌─────────────────────────────────────────────────────┐
│ The first antenna device chooses, according to the  │── S103
│ RSSI and the SINR, to perform frequency adjustment  │
│ and/or antenna alignment with the second antenna    │
│ device                                              │
└─────────────────────────────────────────────────────┘
```

(51) Int. Cl.
*H01Q 1/12* (2006.01)
*H04B 17/318* (2015.01)
*H04B 17/336* (2015.01)

(58) Field of Classification Search
USPC ............. 455/67.11–67.13, 67.7, 226.1–226.4
See application file for complete search history.

(56) References Cited

U.S. PATENT DOCUMENTS

| | | |
|---|---|---|
| 2004/0053634 A1 | 3/2004 | Gainey et al. |
| 2005/0078047 A1 | 4/2005 | Chiang et al. |
| 2007/0066233 A1 | 3/2007 | Smith et al. |
| 2008/0069275 A1* | 3/2008 | Horiguchi ................ H04B 7/10 375/347 |
| 2010/0035653 A1* | 2/2010 | Chang .................. H04W 52/346 455/561 |
| 2010/0167675 A1 | 7/2010 | Zhao |
| 2012/0009965 A1* | 1/2012 | Nakamura ............ H04L 5/0037 455/509 |
| 2013/0040594 A1* | 2/2013 | Vilhar .................... G01R 29/10 455/226.4 |
| 2013/0095882 A1* | 4/2013 | Saito ..................... H04W 88/06 455/552.1 |
| 2013/0142069 A1 | 6/2013 | Xing et al. |
| 2013/0301454 A1* | 11/2013 | Seol ....................... H04B 7/043 370/252 |
| 2014/0192643 A1* | 7/2014 | Kalapatapu ........... H04W 48/00 370/230 |
| 2014/0301339 A1* | 10/2014 | Sesia .................... H04B 1/0067 370/329 |
| 2015/0057007 A1* | 2/2015 | Tarighat Mehrabani .................. H04B 7/2656 455/452.1 |

FOREIGN PATENT DOCUMENTS

| | | |
|---|---|---|
| CN | 1929670 A | 3/2007 |
| CN | 101388701 A | 3/2009 |
| CN | 101465699 A | 6/2009 |
| CN | 101478336 A | 7/2009 |

\* cited by examiner

LINK ADAPTATION METHOD AND DEVICE

CROSS-REFERENCE TO RELATED APPLICATIONS

This application is a continuation of International Application No. PCT/CN2014/082161, filed on Jul. 14, 2014, which claims priority to Chinese Patent Application 201310499691.X, filed on Oct. 22, 2013, both of which are hereby incorporated by reference in their entireties.

TECHNICAL FIELD

The present invention relates to the communications field, and in particular, to a link adaptation method and device.

BACKGROUND

A microwave communication technology is usually applied to point-to-multipoint communication (for example, satellite broadcasting) and point-to-point communication (for example, wireless backhaul). Wireless backhaul communications system includes a backhaul remote end and a backhaul local end, where the backhaul local end is a backhaul device near a network side, and the backhaul remote end is a backhaul device far away from the network side. The wireless backhaul communications system performs data transmission between the backhaul local end and the backhaul remote end, to provide services such as voice and data for a user.

In the practical application, due to impact of an external environment (for example, a strong wind), angles of an antenna corresponding to the backhaul remote end and an antenna corresponding to the backhaul local end are easily caused to be deviated, which disables a communications link between the backhaul remote end and the backhaul local end, and affects normal communication. Therefore, the angles of the antennas corresponding to the two parties need to be adjusted, to align the antennas of the two parties, so as to ensure signal transmission quality. In addition, a radio signal of another device with a same frequency may cause interference to the communications link, which also disables the communications link between the backhaul remote end and the backhaul local end, and affects normal communication. Therefore, communication frequencies corresponding to the two parties also need to be adjusted, so that the two parties select another same frequency, so as to ensure signal transmission quality.

In the prior art, antenna alignment and frequency adjustment are mainly performed manually, labor costs are required during the antenna alignment and the frequency adjustment, and maintenance also requires manual participation. Labor costs are high, and difficulty in alignment is increased.

SUMMARY

The present invention provides a link adaptation method and device, so as to determine, according to transmission quality of a signal in a link, to perform antenna alignment and/or frequency adjustment.

To achieve the foregoing objective, the following technical solutions are provided in embodiments of the present invention:

According to a first aspect, a link adaptation method is provided, where the method includes:

detecting, by a first antenna device, a received signal strength indicator RSSI of a link between the first antenna device and a second antenna device;

when it is determined that the RSSI is greater than or equal to a first RSSI threshold, detecting, by the first antenna device, a signal to interference plus noise ratio SINR of the link; and choosing, by the first antenna device according to the RSSI and the SINR, to perform frequency adjustment and/or antenna alignment with the second antenna device.

In a first possible implementation manner of the first aspect, the choosing, by the first antenna device according to the RSSI and the SINR, to perform frequency adjustment and/or antenna alignment with the second antenna device includes:

when it is determined that the RSSI is greater than or equal to a second RSSI threshold and the SINR is less than an SINR preset threshold, choosing to perform frequency adjustment with the second antenna device, where the second RSSI threshold is greater than the first RSSI threshold.

In a second possible implementation manner of the first aspect, the choosing, by the first antenna device according to the RSSI and the SINR, to perform frequency adjustment and/or antenna alignment with the second antenna device includes:

when it is determined that the RSSI is less than a second RSSI threshold and the SINR is greater than or equal to an SINR preset threshold, choosing to perform antenna alignment with the second antenna device, where the second RSSI threshold is greater than the first RSSI threshold.

In a third possible implementation manner of the first aspect, the choosing, by the first antenna device according to the RSSI and the SINR, to perform frequency adjustment and/or antenna alignment with the second antenna device includes:

when it is determined that the RSSI is less than a second RSSI threshold and the SINR is less than an SINR preset threshold, choosing to perform frequency adjustment and antenna alignment with the second antenna device, where the second RSSI threshold is greater than the first RSSI threshold.

With reference to the first aspect to the third possible implementation manner of the first aspect, in a fourth possible implementation manner, the method further includes:

sending a preset adjustment time to the second antenna device; or receiving a preset adjustment time sent by the second antenna device, where the preset adjustment time is used for indicating a time at which the first antenna device and the second antenna device start to perform frequency adjustment and/or antenna alignment.

With reference to the first aspect to the fourth possible implementation manner of the first aspect, in a fifth possible implementation manner, the method further includes:

when it is determined that the RSSI is less than the first RSSI threshold, choosing to perform frequency adjustment and antenna alignment with the second antenna device.

With reference to any one of the first possible implementation manner to the fifth possible implementation manner, in a sixth possible implementation manner, the performing frequency adjustment with the second antenna device includes:

determining an antenna angle from a preset antenna angle adjustment set; and maintaining the antenna angle, and performing frequency adjustment with the second frequency adjustment device; and the performing antenna alignment with the second antenna device includes:

determining an antenna frequency from a preset frequency adjustment set; and maintaining the antenna frequency, and performing antenna alignment with the second frequency adjustment device.

With reference to the sixth possible implementation manner, in a seventh possible implementation manner, the performing frequency adjustment with the second frequency adjustment device includes:

using, within a first pre-determined time, a first frequency in the preset frequency adjustment set as an antenna frequency corresponding to the first antenna device;

detecting a first RSSI of the link, and when it is determined that the first RSSI is greater than or equal to the first RSSI threshold, detecting a first SINR of the link; and after it is determined, according to the first RSSI and the first SINR, that the first frequency is not a working frequency of an antenna corresponding to the first antenna device, if the first pre-determined time arrives, using, within a first pre-determined time, a second frequency in the preset frequency adjustment set as the antenna frequency corresponding to the first antenna device.

With reference to the seventh possible implementation manner, in an eighth possible implementation manner, the method further includes: after it is determined, according to the first RSSI and the first SINR, that the first frequency is the working frequency of the antenna corresponding to the first antenna device, sending a synchronization signal to the second antenna device, so that the second antenna device determines, according to the synchronization signal, that a current antenna frequency of the second antenna device is a working frequency of an antenna corresponding to the second antenna device.

With reference to the eighth possible implementation manner, in a ninth possible implementation manner, that it is determined, according to the first RSSI and the first SINR, that the first frequency is not the working frequency of the antenna corresponding to the first antenna device includes:

when it is determined that the first RSSI is less than the first RSSI threshold, determining that the first frequency is not the working frequency of the antenna corresponding to the first antenna device; or when it is determined that the first RSSI is greater than or equal to the first RSSI threshold and the first SINR is less than the SINR preset threshold, determining that the first frequency is not the working frequency of the antenna corresponding to the first antenna device; and that it is determined, according to the first RSSI and the first SINR, that the first frequency is the working frequency of the antenna corresponding to the first antenna device includes:

when it is determined that the first RSSI is greater than or equal to the first RSSI threshold and the first SINR is greater than or equal to the SINR preset threshold, determining that the first frequency is the working frequency of the antenna corresponding to the first antenna device.

With reference to the sixth possible implementation manner, in a tenth possible implementation manner, the performing antenna alignment with the second frequency adjustment device includes:

using, within a second pre-determined time, a first antenna angle in the preset antenna angle adjustment set as an antenna angle corresponding to the first antenna device;

detecting a second RSSI of the link, and when it is determined that the second RSSI is greater than or equal to the first RSSI threshold, detecting a second SINR of the link; and after it is determined, according to the second RSSI and the second SINR, that the first antenna angle is not a working angle of an antenna corresponding to the first antenna device, if the second pre-determined time arrives, using, within a second pre-determined time, a second antenna angle in the preset antenna angle adjustment set as the antenna angle corresponding to the first antenna device.

With reference to the tenth possible implementation manner, in an eleventh possible implementation manner, the method further includes: after it is determined, according to the second RSSI and the second SINR, that the first antenna angle is the working angle of the antenna corresponding to the first antenna device, sending a synchronization signal to the second antenna device, so that the second antenna device determines, according to the synchronization signal, that a current antenna angle of the second antenna device is a working angle of an antenna corresponding to the second antenna device.

With reference to the eleventh possible implementation manner, in a twelfth possible implementation manner, that it is determined, according to the second RSSI and the second SINR, that the first antenna angle is not the working angle of the antenna corresponding to the first antenna device includes:

when it is determined that the second RSSI is less than the first RSSI threshold, determining that the first antenna angle is not the working angle of the antenna corresponding to the first antenna device; or when it is determined that the second RSSI is greater than or equal to the first RSSI threshold and is less than the second RSSI threshold, determining that the first antenna angle is not the working angle of the antenna corresponding to the first antenna device; and that it is determined, according to the second RSSI and the second SINR, that the first antenna angle is the working angle of the antenna corresponding to the first antenna device includes:

when it is determined that the second RSSI is greater than or equal to the second RSSI threshold, determining that the first antenna angle is the working angle of the antenna corresponding to the first antenna device.

According to a second aspect, an antenna device is provided, where the antenna device includes:

a detecting unit, configured to detect a received signal strength indicator RSSI of a link between the antenna device and a second antenna device; and when it is determined that the RSSI is greater than or equal to a first RSSI threshold, detect a signal to interference plus noise ratio SINR of the link;

a processing unit, configured to choose, according to the RSSI and the SINR that are detected by the detecting unit, to perform frequency adjustment and/or antenna alignment with the second antenna device; and an antenna, configured to perform signal transmission with the second antenna device.

In a first possible implementation manner of the second aspect, the processing unit is specifically configured to: when it is determined that the RSSI is greater than or equal to a second RSSI threshold and the SINR is less than an SINR preset threshold, choose to perform frequency adjustment with the second antenna device, where the second RSSI threshold is greater than the first RSSI threshold.

In a second possible implementation manner of the second aspect, the processing unit is specifically configured to: when it is determined that the RSSI is less than a second RSSI threshold and the SINR is greater than or equal to an SINR preset threshold, choose to perform antenna alignment with the second antenna device, where the second RSSI threshold is greater than the first RSSI threshold.

In a third possible implementation manner of the second aspect, the processing unit is specifically configured to: when it is determined that the RSSI is less than a second RSSI threshold and the SINR is less than an SINR preset threshold, choose to perform frequency adjustment and antenna alignment with the second antenna device, where the second RSSI threshold is greater than the first RSSI threshold.

With reference to the second aspect to the third possible implementation manner of the second aspect, in a fourth possible implementation manner, the antenna is specifically configured to send a preset adjustment time to the second antenna device; or specifically configured to receive a preset adjustment time sent by the second antenna device, where the preset adjustment time is used for indicating a time at which the first antenna device and the second antenna device start to perform frequency adjustment and/or antenna alignment.

With reference to the second aspect to the fourth possible implementation manner of the second aspect, in a fifth possible implementation manner, the processing unit is further configured to: when it is determined that the RSSI is less than the first RSSI threshold, choose to perform frequency adjustment and antenna alignment with the second antenna device.

With reference to any one of the first possible implementation manner to the fifth possible implementation manner, in a sixth possible implementation manner, the processing unit is specifically configured to determine an antenna angle from a preset antenna angle adjustment set; and maintain the antenna angle, and perform frequency adjustment with the second frequency adjustment device; and the processing unit is specifically configured to determine an antenna frequency from a preset frequency adjustment set; and maintain the antenna frequency, and perform antenna alignment with the second frequency adjustment device.

With reference to the sixth possible implementation manner, in a seventh possible implementation manner, the processing unit is specifically configured to use, within a first pre-determined time, a first frequency in the preset frequency adjustment set as an antenna frequency corresponding to the first antenna device; detect a first RSSI of the link, and when it is determined that the first RSSI is greater than or equal to the first RSSI threshold, detect a first SINR of the link; and after it is determined, according to the first RSSI and the first SINR, that the first frequency is not a working frequency of an antenna corresponding to the first antenna device, if the first pre-determined time arrives, use, within a first pre-determined time, a second frequency in the preset frequency adjustment set as the antenna frequency corresponding to the first antenna device.

With reference to the seventh possible implementation manner, in an eighth possible implementation manner, the antenna is further configured to: after the processing unit determines, according to the first RSSI and the first SINR, that the first frequency is the working frequency of the antenna corresponding to the first antenna device, send a synchronization signal to the second antenna device, so that the second antenna device determines, according to the synchronization signal, that a current antenna frequency of the second antenna device is a working frequency of an antenna corresponding to the second antenna device.

With reference to the eighth possible implementation manner, in a ninth possible implementation manner, the processing unit is specifically configured to: when it is determined that the first RSSI is less than the first RSSI threshold, determine that the first frequency is not the working frequency of the antenna corresponding to the first antenna device; or when it is determined that the first RSSI is greater than or equal to the first RSSI threshold and the first SINR is less than the SINR preset threshold, determine that the first frequency is not the working frequency of the antenna corresponding to the first antenna device; and the processing unit is specifically configured to: when it is determined that the first RSSI is greater than or equal to the first RSSI threshold and the first SINR is greater than or equal to the SINR preset threshold, determine that the first frequency is the working frequency of the antenna corresponding to the first antenna device.

With reference to the sixth possible implementation manner, in a tenth possible implementation manner, the processing unit is specifically configured to use, within a second pre-determined time, a first antenna angle in the preset antenna angle adjustment set as an antenna angle corresponding to the first antenna device; detect a second RSSI of the link, and when it is determined that the second RSSI is greater than or equal to the first RSSI threshold, detect a second SINR of the link; and after it is determined, according to the second RSSI and the second SINR, that the first antenna angle is not a working angle of an antenna corresponding to the first antenna device, if the second pre-determined time arrives, use, within a second pre-determined time, a second antenna angle in the preset antenna angle adjustment set as the antenna angle corresponding to the first antenna device.

With reference to the tenth possible implementation manner, in an eleventh possible implementation manner, the antenna is further configured to: after the processing unit determines, according to the second RSSI and the second SINR, that the first antenna angle is the working angle of the antenna corresponding to the first antenna device, send a synchronization signal to the second antenna device, so that the second antenna device determines, according to the synchronization signal, that a current antenna angle of the second antenna device is a working angle of an antenna corresponding to the second antenna device.

With reference to the eleventh possible implementation manner, in a twelfth possible implementation manner, the processing unit is specifically configured to: when it is determined that the second RSSI is less than the first RSSI threshold, determine that the first antenna angle is not the working angle of the antenna corresponding to the first antenna device; or when it is determined that the second RSSI is greater than or equal to the first RSSI threshold and is less than the second RSSI threshold, determine that the first antenna angle is not the working angle of the antenna corresponding to the first antenna device; and the processing unit is specifically configured to: when it is determined that the second RSSI is greater than or equal to the second RSSI threshold, determine that the first antenna angle is the working angle of the antenna corresponding to the first antenna device.

According to the foregoing solutions, a first antenna device can determine, according to an RSSI and a corresponding SINR of a link, to perform frequency adjustment and/or antenna alignment, to implement link adaptation intelligently according to a current status of the link. No manual intervention is required, and labor costs are reduced in a case in which signal transmission quality is ensured.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. Relational terms such as first and second are only used to distinguish one entity or operation from another, but do not necessarily require or imply that any actual relationship or sequence exists between these entities or operations. Moreover, the term "include", "comprise", or their any other variant is intended to cover a non-exclusive inclusion, so that a process, a method, an article, or an apparatus that includes a list of elements not only includes those elements but also includes other elements that are not expressly listed, or further includes elements inherent to such process, method, article, or apparatus. An element preceded by "includes a . . . " does not, without more constraints, preclude the existence of additional identical elements in the process, method, article, or apparatus that includes the element.

Figure 1:
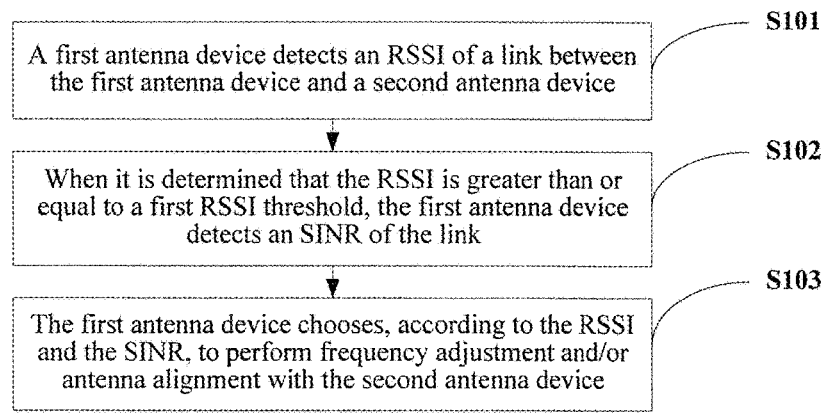
FIG. 1 is a schematic diagram of a link adaptation method according to an embodiment of the present invention.

An embodiment of the present invention provides a link adaptation method, as shown in FIG. 1. The method embodiment is executed by a first antenna device, and in the method embodiment, the first antenna device may be a backhaul remote end or a backhaul local end, and a corresponding second antenna device is a backhaul local end or a backhaul remote end. The method includes:

S101: The first antenna device detects an RSSI (Received Signal Strength Indication, received signal strength indicator) of a link between the first antenna device and the second antenna device.

S102: When it is determined that the RSSI is greater than or equal to a first RSSI threshold, the first antenna device detects an SINR (signal to interference plus noise ratio) of the link.

It should be noted that, when it is determined that the RSSI is greater than or equal to the first RSSI threshold, it indicates that the link is not out of synchronization, and the first antenna device and the second antenna device transmit a synchronization signal to each other. However, in a signal transmission process, interference may be caused to the link and affects signal transmission quality, and therefore, when it is determined that the RSSI is greater than or equal to the first RSSI threshold, the first antenna device may further acquire an SINR according to a received signal transmitted in the link, where the received signal may be the foregoing synchronization signal, and the first antenna device performs frequency adjustment and/or antenna alignment with the second antenna device according to the RSSI and the SINR.

S103: The first antenna device chooses, according to the RSSI and the SINR, to perform frequency adjustment and/or antenna alignment with the second antenna device.

Specifically, step 103 is described with reference to FIG. 2. The figure includes an x-axis and a y-axis, where the x-axis indicates the RSSI, the y-axis indicates the SINR, a direction of an arrow of the x-axis indicates that the RSSI gradually increases, a direction of an arrow of the y-axis indicates that the SINR gradually increases, an A point on the x-axis indicates the first RSSI threshold, a B point on the x-axis indicates a second RSSI threshold, where the second RSSI threshold is greater than the first RSSI threshold, and a C point on the y-axis indicates an SINR preset threshold. It can be seen from the figure that, this embodiment of the present invention includes the following three cases:

Case 1: When it is determined that the RSSI is greater than or equal to the second RSSI threshold and the SINR is less than the SINR preset threshold, the first antenna device chooses to perform frequency adjustment with the second antenna device.

Case 2: When it is determined that the RSSI is less than the second RSSI threshold and the SINR is greater than or equal to the SINR preset threshold, the first antenna device chooses to perform antenna alignment with the second antenna device.

Case 3: When it is determined that the RSSI is less than the second RSSI threshold and the SINR is less than the SINR preset threshold, the first antenna device chooses to perform frequency adjustment and antenna alignment with the second antenna device.

Similarly, the second antenna device may also determine, according to a detected RSSI and SINR, to perform frequency adjustment and/or antenna alignment. Reference may be made to the foregoing Case 1 to Case 3 for details, which are not described herein again.

Further, the first antenna device sends a preset adjustment time to the second antenna device, or receives a preset adjustment time sent by the second antenna device.

The preset adjustment time is used for indicating a time at which the first antenna device and the second antenna device start to perform frequency adjustment and/or antenna alignment.

Specifically, the preset adjustment time may be preset on the first antenna device, or may be preset on the second antenna device, and is sent to the other antenna device by using a negotiation message.

For example, at 07:00, the first antenna device determines, by detecting an RSSI, that the link is not out of synchronization, but determines, according to the RSSI and a corresponding SINR, to perform frequency adjustment and/or antenna alignment at 07:30 (that is, the preset adjustment time), and then the first antenna device sends the time (that is, 07:30) to the second antenna device, so that the second antenna device and the first antenna device simultaneously start to perform frequency adjustment and/or antenna alignment when 07:30 arrives. The foregoing description is merely exemplary, and sets no limitation.

In addition, the negotiation message may further include an adjustment manner, where the adjustment manner includes frequency adjustment and/or antenna alignment. The first antenna device sends a determined adjustment manner to the second antenna device, and the first antenna device and the second antenna device perform frequency adjustment and/or antenna alignment according to the adjustment manner after the preset adjustment time arrives.

Specifically, if the first antenna device determines to perform frequency adjustment, the first antenna device sends the preset adjustment time and an adjustment manner (that is, frequency adjustment) to the second antenna device, and the first antenna device and the second antenna device perform frequency adjustment after the preset adjustment time arrives.

If the first antenna device determines to perform antenna alignment, the first antenna device sends the preset adjustment time and an adjustment manner (that is, antenna alignment) to the second antenna device, and the first antenna device and the second antenna device perform antenna alignment after the preset adjustment time arrives.

If the first antenna device determines to perform frequency adjustment and antenna alignment, the first antenna device sends the preset adjustment time and an adjustment manner (that is, frequency adjustment and antenna alignment) to the second antenna device, and the first antenna device and the second antenna device perform frequency adjustment and antenna alignment after the preset adjustment time arrives.

Certainly, the second antenna device may determine that the link is not out of synchronization and the second antenna device determines to perform frequency adjustment and/or antenna alignment, and therefore, the first antenna device may receive an adjustment manner sent by the second antenna device, so that the first antenna device and the second antenna device perform frequency adjustment and/or antenna alignment according to the adjustment manner after the preset adjustment time arrives, so as to determine transmit frequencies of an antenna corresponding to the first antenna device and an antenna corresponding to the second antenna device.

In addition, in an actual application, an adjustment manner determined by the first antenna device may be different from an adjustment manner determined by the second antenna device. For example, the first antenna device determines to perform frequency adjustment while the second antenna device determines to perform antenna alignment; in this case, the first antenna device and the second antenna device perform both frequency adjustment and antenna alignment. For another example, the first antenna device determines to perform frequency adjustment while the second antenna device determines to perform frequency adjustment and antenna alignment; in this case, the first antenna device and the second antenna device perform both frequency adjustment and antenna alignment. For still another example, the first antenna device determines to perform frequency adjustment while the second antenna device determines not to perform frequency adjustment and/or antenna alignment; in this case, the first antenna device and the second antenna device still need to perform frequency adjustment, that is, if either of the first antenna device and the second antenna device determines to perform frequency adjustment and/or antenna alignment, the first antenna device and the second antenna device perform frequency adjustment and/or antenna alignment accordingly. However, for a convenient description, in all of the following embodiments, a description is made by using an example in which an adjustment manner determined by the first antenna device is the same as an adjustment manner determined by the second antenna device (that is, the first antenna device determines to perform frequency adjustment and the second antenna device also determines to perform frequency adjustment; or the first antenna device determines to perform antenna alignment and the second antenna device also determines to perform antenna alignment; or the first antenna device determines to perform frequency adjustment and antenna alignment and the second antenna device also determines to perform frequency adjustment and antenna alignment), which is not limited.

Further, when it is determined that the RSSI is less than the first RSSI threshold, the first antenna device chooses to perform frequency adjustment and antenna alignment with the second antenna device.

It should be noted that, when the first antenna device determines that the RSSI is less than the first RSSI threshold, that is, determines that the link between the first antenna device and the second antenna device is out of synchronization, the first antenna device stops sending a signal to the second antenna device, where the signal may be a synchronization signal indicating link synchronization. Similarly, the second antenna device determines, by detecting an RSSI of the link between the second antenna device and the first antenna device, that the link is out of synchronization, and then, the first antenna device and the second antenna device perform frequency adjustment and antenna alignment, so that the link between the first antenna device and the second antenna device recovers synchronization.

Further, the performing frequency adjustment may be: determining, by the first antenna device, an antenna angle from a preset antenna angle adjustment set; and maintaining the antenna angle, and performing frequency adjustment with the second frequency adjustment device.

Specifically, the first antenna device uses, within a first pre-determined time, a first frequency in a preset frequency adjustment set as an antenna frequency corresponding to the first antenna device; detects a first RSSI of the link, and when it is determined that the first RSSI is greater than or equal to the first RSSI threshold, detects a first SINR of the link; and after it is determined, according to the first RSSI and the first SINR, that the first frequency is not a working frequency of the antenna corresponding to the first antenna device, if the first pre-determined time arrives, uses, within a first pre-determined time, a second frequency in the preset frequency adjustment set as the antenna frequency corresponding to the first antenna device.

When it is determined that the first RSSI is less than the first RSSI threshold, the first antenna device determines that the first frequency is not the working frequency of the antenna corresponding to the first antenna device; or when it is determined that the first RSSI is greater than or equal to the first RSSI threshold and the first SINR is less than the SINR preset threshold, the first antenna device determines that the first frequency is not the working frequency of the antenna corresponding to the first antenna device.

Similarly, the second antenna device uses, within a third pre-determined time, the first frequency in the preset frequency adjustment set as an antenna frequency corresponding to the second antenna device; detects an RSSI of the link, and when it is determined that the RSSI is greater than or equal to the first RSSI threshold, detects an SINR of the link; and after it is determined, according to the RSSI and the SINR, that the first frequency is not a working frequency of the antenna corresponding to the second antenna device, if the third pre-determined time arrives, uses, within a third pre-determined time, the second frequency in the preset frequency adjustment set as the working frequency of the antenna corresponding to the second antenna device.

In a possible implementation manner of the present invention, the first pre-determined time is greater than or equal to a product of the third pre-determined time and a quantity of frequencies in the preset frequency adjustment set, or the third pre-determined time is greater than or equal to a product of the first pre-determined time and a quantity of frequencies in the preset frequency adjustment set. In this embodiment of the present invention, a description is made by using an example in which the third pre-determined time is the product of the first pre-determined time and the quantity of the frequencies in the preset frequency adjustment set, which is not limited in the present invention.

Figure 3:
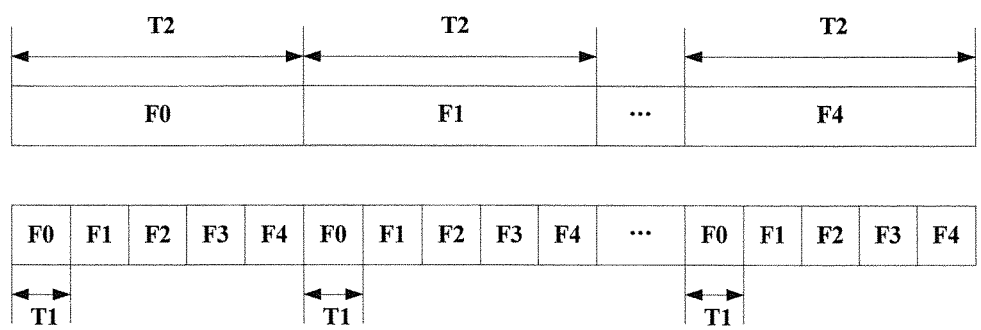
FIG. 3 is a schematic diagram of frequency adjustment according to an embodiment of the present invention.

Exemplarily, that the first antenna device and the second antenna device perform frequency adjustment is specifically described according to FIG. 3. The preset frequency adjustment set includes five adjustable frequencies F0 to F4, the first antenna device uses, within a first pre-determined time T1, the frequency F0 as a corresponding antenna frequency, the second antenna device uses, within a third pre-determined time T2, the frequency F0 as a corresponding antenna frequency, and the third pre-determined time is obtained by multiplying the first pre-determined time by five (that is, the quantity of the frequencies included in the preset frequency adjustment set); in this way, when the antenna frequency corresponding to the first antenna device is F0 and the antenna frequency corresponding to the second antenna device is F0, if the first antenna device and the second antenna device respectively determine, according to a detected first RSSI and a detected second RSSI, that the frequency F0 is neither a working frequency of the antenna corresponding to the first antenna device nor a working frequency of the antenna corresponding to the second antenna device, when the first pre-determined time T1 arrives at the first antenna device, the first antenna device adjusts the antenna frequency corresponding to the first antenna device from the frequency F0 to the frequency F1. In this case, because the third pre-determined time T2 has not arrived at the second antenna device, the second antenna device still uses F0 as the corresponding antenna frequency; in this way, when the antenna frequency corresponding to the first antenna device is F1 and the antenna frequency corresponding to the second antenna device is F0, the first antenna device and the second antenna device determine, according to respectively detected RSSIs and SINRs, whether the frequency F1 and the frequency F0 are respectively the working frequency of the antenna corresponding to the first antenna device and the working frequency of the antenna corresponding to the second antenna device. If the working frequency of the antenna corresponding to the first antenna device and the working frequency of the antenna corresponding to the second antenna device are still not determined, when a first pre-determined time T1 arrives, the first antenna device continues to sequentially adjust the antenna frequency corresponding to the first antenna device to remaining frequencies in the preset frequency adjustment set (that is, the frequency F2 to the frequency F4), until the working frequency of the antenna corresponding to the first antenna device and the working frequency of the antenna corresponding to the second antenna device are determined.

After the first antenna device sequentially performs detection on all the frequencies in the preset frequency adjustment set (that is, the frequency F0 to the frequency F4), if the working frequency of the antenna corresponding to the first antenna device and the working frequency of the antenna corresponding to the second antenna device are still not determined, when the third pre-determined time T2 arrives at the second antenna device, the second antenna device adjusts the corresponding antenna frequency from the frequency F0 to the frequency F1. In this case, the first antenna device continues to sequentially adjust the corresponding antenna frequency to the frequencies in the preset frequency adjustment set (that is, F0 to F4) and correspondingly detects an RSSI and an SINR. When a third pre-determined time arrives again at the second antenna device, if the working frequency of the antenna corresponding to the first antenna device and the working frequency of the antenna corresponding to the second antenna device are still not determined, the second antenna device continues to sequentially adjust the corresponding antenna frequency to the remaining frequencies in the preset frequency adjustment set (that is, the frequency F2 to the frequency F4), until the working frequency of the antenna corresponding to the first antenna device and the working frequency of the antenna corresponding to the second antenna device are determined. The foregoing description is merely exemplary, and sets no limitation.

It can be seen from the foregoing that, the frequency adjustment in this embodiment of the present invention mainly means that, either antenna device keeps a frequency in a preset frequency adjustment set as a corresponding antenna frequency, and the other antenna device sequentially uses each frequency in the preset frequency adjustment set as a corresponding antenna frequency, and detects an RSSI and an SINR to determine a working frequency of an antenna corresponding to the first antenna device and a working frequency of an antenna corresponding to the second antenna device. If the working frequency of the antenna corresponding to the first antenna device and the working frequency of the antenna corresponding to the second antenna device are still not determined, the either antenna device adjusts the current antenna frequency to another frequency in the preset frequency adjustment set, until the working frequency of the antenna corresponding to the first antenna device and the working frequency of the antenna corresponding to the second antenna device are determined.

Further, after it is determined, according to the first RSSI and the first SINR, that the first frequency is the working frequency of the antenna corresponding to the first antenna device, the first antenna device sends a synchronization signal to the second antenna device, so that the second antenna device determines, according to the synchronization signal, that a current antenna frequency of the second antenna device is the working frequency of the antenna corresponding to the second antenna device.

Specifically, after it is determined that the first RSSI is greater than or equal to the first RSSI threshold and the first SINR is greater than or equal to the SINR preset threshold, the first antenna device determines that the first frequency is the working frequency of the antenna corresponding to the first antenna device.

Similarly, the second antenna device sends a synchronization signal to the first antenna device, so that the first antenna device determines, according to the synchronization signal, that a current frequency of the first antenna device is the working frequency of the antenna corresponding to the first antenna device.

It should be noted that, in another possible implementation manner of the present invention, the first pre-determined time and the third pre-determined time may be the same. Exemplarily, the preset frequency adjustment set includes five adjustable frequencies F0 to F4, and when the first antenna device and the second antenna device determine, according to the preset adjustment time, to perform frequency adjustment, the first antenna device and the second antenna device each use the frequency F0 as a corresponding antenna frequency, and determine, according to a detected RSSI and SINR, whether the frequency F0 is a working frequency of a corresponding antenna. If it is determined that the frequency F0 is not the working frequency of the corresponding antenna, when the first pre-determined time and the third pre-determined time (the first pre-determined time and the third pre-determined time are the same) arrive at the first antenna device and the second antenna device, the first antenna device and the second antenna device simultaneously (the first pre-determined time and the third pre-determined time are the same) adjust the frequency F0 to F1, and determine, according to a detected RSSI and SINR, whether the frequency F1 is the working frequency of the corresponding antenna. If it is determined that the frequency F1 is not the working frequency of the corresponding antenna, the first antenna device and the second antenna device continue to simultaneously adjust the frequency F1 to F2 to F4 in sequence, until the working frequency of the corresponding antenna is determined according to a detected RSSI and SINR. In this way, it is ensured that an antenna frequency of the first antenna device keeps the same as an antenna frequency of the second antenna device (for example, the frequency of the first antenna device is F0 and the frequency of the second antenna device is F0), thereby improving frequency adjustment efficiency.

In addition, when sequentially using, according to the first pre-determined time, the frequencies in the preset frequency adjustment set as the corresponding antenna frequency, the first antenna device may sequentially use, in order, the frequencies in the preset frequency adjustment set as the corresponding antenna frequency. For example, the first antenna device may sequentially use, in ascending order of transmit frequencies, the frequencies in the preset frequency adjustment set as the corresponding antenna frequency. Certainly, the first antenna device may sequentially use, in descending order, the frequencies in the preset frequency adjustment set as the corresponding antenna frequency, which is not limited in the present invention.

Further, the performing antenna alignment may be specifically: determining, by the first antenna device, an antenna frequency from the preset frequency adjustment set; and maintaining the antenna frequency, and performing antenna alignment with the second frequency adjustment device.

Specifically, the first antenna device uses, within a second pre-determined time, a first antenna angle in the preset antenna angle adjustment set as an antenna angle corresponding to the first antenna device; detects a second RSSI of the link, and when it is determined that the second RSSI is greater than or equal to the first RSSI threshold, detects a second SINR of the link; and after it is determined, according to the second RSSI and the second SINR, that the first antenna angle is not a working angle of the antenna corresponding to the first antenna device, if the second pre-determined time arrives, uses, within a second pre-determined time, a second antenna angle in the preset antenna angle adjustment set as the antenna angle corresponding to the first antenna device.

When it is determined that the second RSSI is less than the first RSSI threshold, the first antenna device determines that the first antenna angle is not the working angle of the antenna corresponding to the first antenna device; or when it is determined that the second RSSI is greater than or equal to the first RSSI threshold and is less than the second RSSI threshold, the first antenna device determines that the first antenna angle is not the working angle of the antenna corresponding to the first antenna device.

Similarly, the second antenna device uses, within a fourth pre-determined time, the first antenna angle in the preset antenna angle adjustment set as the antenna angle corresponding to the second antenna device; detects an RSSI of the link, and when it is determined that the RSSI is greater than or equal to the first RSSI threshold, detects an SINR of the link; and after it is determined, according to the RSSI and the SINR, that the first antenna angle is not a working angle of the antenna corresponding to the second antenna device, if the fourth pre-determined time arrives, uses, within a fourth pre-determined time, the second antenna angle in the preset antenna angle adjustment set as the working angle of the antenna corresponding to the second antenna device.

In a possible implementation manner of the present invention, the second pre-determined time is greater than or equal to a product of the fourth pre-determined time and a quantity of antenna angles in the preset antenna angle adjustment set, or the fourth pre-determined time is greater than or equal to a product of the second pre-determined time and the quantity of the antenna angles in the preset antenna angle adjustment set. In this embodiment of the present invention, a description is made by using an example in which the fourth pre-determined time is the product of the second pre-determined time and the quantity of the antenna angles in the preset antenna angle adjustment set, which is not limited in the present invention.

Figure 4:
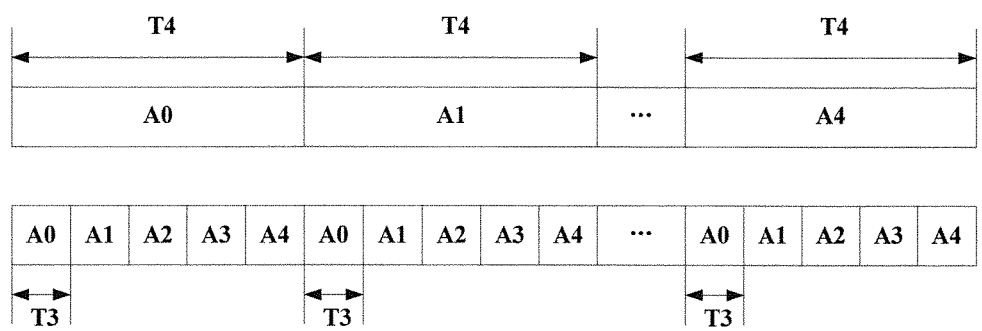
FIG. 4 is a schematic diagram of antenna alignment according to an embodiment of the present invention.

Exemplarily, that the first antenna device and the second antenna device perform antenna alignment is specifically described according to FIG. 4. The preset antenna angle adjustment set includes five adjustable antenna angles A0 to A4, the first antenna device uses, within a second pre-determined time T3, the angle A0 as a corresponding antenna angle, the second antenna device uses, within a fourth pre-determined time T4, the angle A0 as a corresponding antenna angle, and the fourth pre-determined time is obtained by multiplying the second pre-determined time by five (that is, the quantity of angles included in the preset antenna angle adjustment set); in this way, when the antenna angle corresponding to the first antenna device is A0 and the antenna angle corresponding to the second antenna device is A0, if the first antenna device and the second antenna device respectively determine, according to a detected first RSSI and a detected second RSSI, that the angle A0 is neither a working angle of the antenna corresponding to the first antenna device nor a working angle of the antenna corresponding to the second antenna device, when the second pre-determined time T3 arrives at the first antenna device, the first antenna device adjusts the antenna angle corresponding to the first antenna device from the angle A0 to the angle A1. In this case, because the fourth pre-determined time T4 has not arrived at the second antenna device, the second antenna device still uses A0 as the corresponding antenna angle; in this way, when the antenna angle corresponding to the first antenna device is A1 and the antenna angle corresponding to the second antenna device is A0, the first antenna device and the second antenna device determine, according to respectively detected RSSIs and SINRs, whether the angle A1 and the angle A0 are respectively the working angle of the antenna corresponding to the first antenna device and the working angle of the antenna corresponding to the second antenna device. If the working angle of the antenna corresponding to the first antenna device and the working angle of the antenna corresponding to the second antenna device are still not determined, when a second pre-determined time T3 arrives, the first antenna device continues to sequentially adjust the antenna angle corresponding to the first antenna device to remaining antenna angles in the preset antenna angle adjustment set (that is, the angle A2 to the angle A4), until the working angle of the antenna corresponding to the first antenna device and the working angle of the antenna corresponding to the second antenna device are determined.

After the first antenna device sequentially performs detection on all the antenna angles in the preset antenna angle adjustment set (that is, the angle A0 to the angle A4), if the working angle of the antenna corresponding to the first antenna device and the working angle of the antenna corresponding to the second antenna device are still not determined, when the fourth pre-determined time T4 arrives at the second antenna device, the second antenna device adjusts the corresponding antenna angle from the angle A0 to the angle A1. In this case, the first antenna device continues to sequentially adjust the corresponding antenna angle to the antenna angles in the preset antenna angle adjustment set (that is, A0 to A4) and correspondingly detects an RSSI and an SINR. When a fourth pre-determined time arrives again at the second antenna device, if the working angle of the antenna corresponding to the first antenna device and the working angle of the antenna corresponding to the second antenna device are still not determined, the second antenna device continues to sequentially adjust the corresponding antenna angle to the remaining antenna angles in the preset antenna angle adjustment set (that is, the angle A2 to the angle A4), until the working angle of the antenna corresponding to the first antenna device and the working angle of the antenna corresponding to the second antenna device are determined. The foregoing description is merely exemplary, and sets no limitation.

It can be seen from the foregoing that, the antenna alignment in this embodiment of the present invention mainly means that, either antenna device keeps an antenna angle in a preset antenna angle adjustment set as a corresponding antenna angle, and the other antenna device sequentially uses each angle in the preset antenna angle adjustment set as a corresponding antenna angle, and detects an RSSI and an SINR to determine a working angle of an antenna corresponding to the first antenna device and a working angle of an antenna corresponding to the second antenna device. If the working angle of the antenna corresponding to the first antenna device and the working angle of the antenna corresponding to the second antenna device are still not determined, the either antenna device adjusts the current antenna angle to another angle in the preset antenna angle adjustment set, until the working angle of the antenna corresponding to the first antenna device and the working angle of the antenna corresponding to the second antenna device are determined.

Further, after it is determined, according to the second RSSI and the second SINR, that the first antenna angle is the working angle of the antenna corresponding to the first antenna device, the first antenna device sends a synchronization signal to the second antenna device, so that the second antenna device determines, according to the synchronization signal, that a current antenna angle of the second antenna device is the working angle of the antenna corresponding to the second antenna device.

Specifically, when it is determined that the second RSSI is greater than or equal to the second RSSI threshold, the first antenna device determines that the first antenna angle is the working angle of the antenna corresponding to the first antenna device.

Similarly, the second antenna device sends a synchronization signal to the first antenna device, so that the first antenna device determines, according to the synchronization signal, that a current antenna angle of the first antenna device is the working angle of the antenna corresponding to the first antenna device.

It should be noted that, in another possible implementation manner of the present invention, the second pre-determined time and the fourth pre-determined time may be the same. Exemplarily, the preset antenna angle adjustment set includes five adjustable angles A0 to A4, and when the first antenna device and the second antenna device determine, according to the preset adjustment time, to perform antenna alignment, the first antenna device and the second antenna device each use the angle A0 as a corresponding antenna angle, and determine, according to a detected RSSI and SINR, whether the angle A0 is a working angle of a corresponding antenna. If it is determined that the angle A0 is not the working angle of the corresponding antenna, when the second pre-determined time and the fourth pre-determined time (the second pre-determined time and the fourth pre-determined time are the same) arrive at the first antenna device and the second antenna device, the first antenna device and the second antenna device simultaneously (the second pre-determined time and the fourth pre-determined time are the same) adjust the angle A0 to A1, and determine, according to a detected RSSI and SINR, whether the angle A1 is the working angle of the corresponding antenna. If it is determined that the angle A1 is not the working angle of the corresponding antenna, the first antenna device and the second antenna device continue to simultaneously adjust the angle A1 to A2 to A4 in sequence, until the working angle of the corresponding antenna is determined according to a detected RSSI and SINR. In this way, it is ensured that an antenna angle of the first antenna device keeps the same as an antenna angle of the second antenna device (for example, the angle of the first antenna device is A0 and the angle of the second antenna device is A0), to perform detection, thereby improving antenna alignment efficiency.

In addition, when sequentially using, according to the second pre-determined time, the antenna angles in the preset antenna angle adjustment set as the corresponding antenna angle, the first antenna device may sequentially use, in order, the antenna angles in the preset antenna angle adjustment set as the corresponding antenna angle. For example, the first antenna device may sequentially use, in ascending order of angles, the antenna angles in the preset antenna angle adjustment set as the corresponding antenna angle. Certainly, the first antenna device may sequentially use, in descending order, the antenna angles in the preset antenna angle adjustment set as the corresponding antenna angle, which is not limited in the present invention.

In another possible implementation manner of the present invention, when the link between the first antenna device and the second antenna device is out of synchronization and strong interference is caused to a transmitted signal, which causes relatively poor transmission quality of the signal, the foregoing frequency adjustment and antenna alignment may be combined, to further improve signal transmission quality. Specific implementation of the combination includes the following two manners:

Manner 1: The first frequency adjustment device keeps an antenna angle and performs, based on the antenna angle, frequency adjustment with the second antenna device; after the frequency adjustment is completed, adjusts the antenna angle to another antenna angle in the preset antenna angle adjustment set and performs frequency adjustment with the second antenna device again; and if an antenna frequency corresponding to the first antenna device and an antenna frequency corresponding to the second antenna device are still not determined, continues to sequentially adjust the antenna angle corresponding to the first antenna device to the remaining angles in the preset antenna angle adjustment set and perform frequency adjustment, until the antenna frequency corresponding to the first antenna device and the antenna frequency corresponding to the second antenna device are determined.

For the frequency adjustment herein, reference may be made to the foregoing description of frequency adjustment performed by the first frequency device, and details are not described herein again.

Manner 2: The first frequency adjustment device keeps a corresponding antenna frequency and performs, based on the antenna frequency, antenna alignment with the second antenna device; after the antenna alignment is completed, adjusts the antenna frequency to another frequency in the preset frequency adjustment set and performs antenna alignment with the second antenna device again; and if a working frequency of the antenna corresponding to the first antenna device and a working frequency of the antenna corresponding to the second antenna device are still not determined, continues to sequentially adjust the antenna frequency corresponding to the first antenna device to the remaining frequencies in the preset frequency adjustment set and perform antenna alignment, until the working frequency of the antenna corresponding to the first antenna device and the working frequency of the antenna corresponding to the second antenna device are determined.

For the antenna alignment herein, reference may be made to the foregoing description of antenna alignment performed by the first frequency device, and details are not described herein again.

It can be seen from the foregoing that, a difference between Manner 1 and Manner 2 lies in that, in Manner 1, an antenna angle is kept first and then frequency adjustment is performed, and after the frequency adjustment, if a working frequency can still not be determined, the antenna angle is further adjusted; and in Manner 2, an antenna frequency is kept first and then antenna alignment is performed, and after the antenna alignment, if a working frequency can still not be determined, frequency adjustment is further performed.

It should be noted that, in normal communication, strong interference is more easily caused to signal transmission, and therefore, in an actual application, a solution in Manner 1 may be preferably used, to improve signal transmission quality faster.

According to the foregoing solution, a first antenna device can determine, according to an RSSI and a corresponding SINR of a link, to perform frequency adjustment and/or antenna alignment, to implement link adaptation intelligently according to a current status of the link. No manual intervention is required, and labor costs are reduced in a case in which signal transmission quality is ensured.

Figure 5:
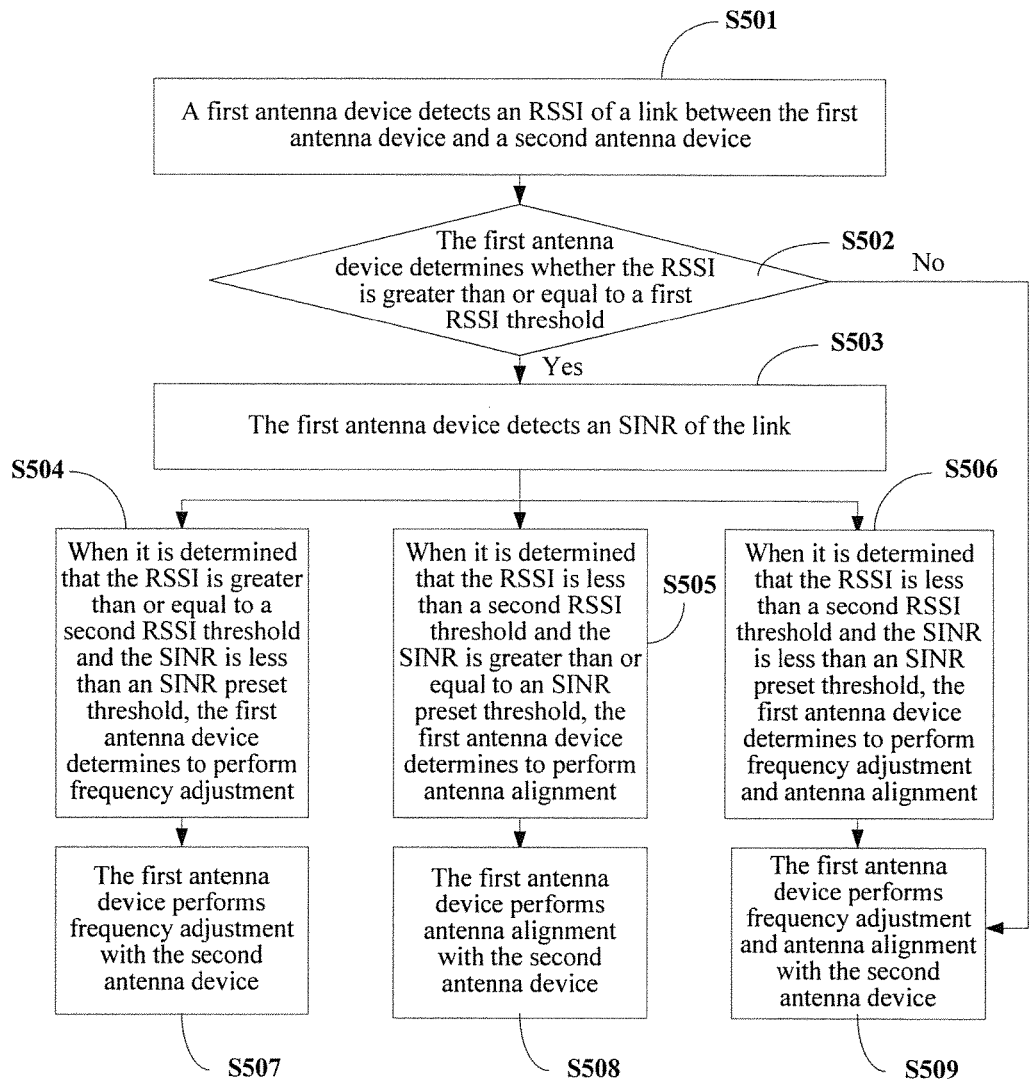
FIG. 5 is a schematic flowchart of a link adaptation method according to an embodiment of the present invention.

An embodiment of the present invention provides a link adaptation method, as shown in FIG. 5. In the method embodiment, a first antenna device may be a backhaul remote end or a backhaul local end, and a corresponding second antenna device is a backhaul local end or a backhaul remote end. The method includes:

S501: The first antenna device detects an RSSI of a link between the first antenna device and the second antenna device.

It should be noted that, in this embodiment of the present invention, a description is made by using an example in which an adjustment manner (including frequency adjustment and antenna alignment) determined by the first antenna device and an adjustment manner determined by the second antenna device are the same (that is, the first antenna device determines to perform frequency adjustment and the second antenna device also determines to perform frequency adjustment; or the first antenna device determines to perform antenna alignment and the second antenna device also determines to perform antenna alignment; or the first antenna device determines to perform frequency adjustment and antenna alignment and the second antenna device also determines to perform frequency adjustment and antenna alignment), which is not limited.

S502: The first antenna device determines whether the RSSI is greater than or equal to a first RSSI threshold.

When the first antenna device determines that the RSSI is greater than or equal to the first RSSI threshold, step S503 is performed.

When the first antenna device determines that the RSSI is less than the first RSSI threshold, step S509 is performed.

S503: The first antenna device detects an SINR of the link.

It should be noted that, when it is determined that the RSSI is greater than or equal to the first RSSI threshold, it indicates that the link is not out of synchronization, and the first antenna device and the second antenna device transmit a synchronization signal to each other. However, in a signal transmission process, interference may be caused to the link and affects signal transmission quality, and therefore, when it is determined that the RSSI is greater than or equal to the first RSSI threshold, the first antenna device may further acquire an SINR according to a received signal transmitted in the link, where the received signal may be the foregoing synchronization signal, and the first antenna device performs frequency adjustment and/or antenna alignment with the second antenna device according to the RSSI and the SINR.

S504: When it is determined that the RSSI is greater than or equal to a second RSSI threshold and the SINR is less than an SINR preset threshold, the first antenna device determines to perform frequency adjustment, and step S507 is performed.

The second RSSI threshold is greater than the first RSSI threshold.

S505: When it is determined that the RSSI is less than a second RSSI threshold and the SINR is greater than or equal to an SINR preset threshold, the first antenna device determines to perform antenna alignment, and step S508 is performed.

S506: When it is determined that the RSSI is less than a second RSSI threshold and the SINR is less than an SINR preset threshold, the first antenna device determines to perform frequency adjustment and antenna alignment, and step S509 is performed.

Figure 2:
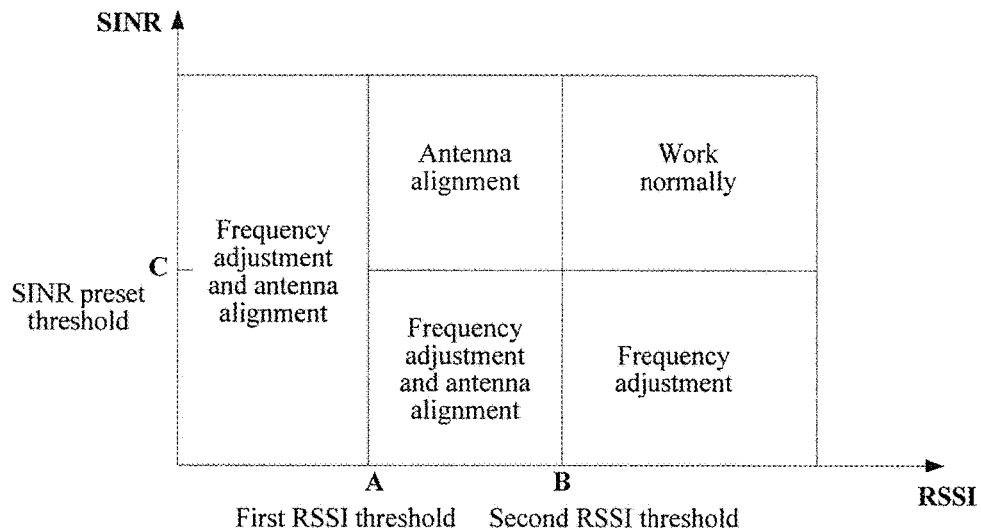
FIG. 2 is a schematic diagram of thresholds in a link adaptation method according to an embodiment of the present invention.

Reference may be made to the description of FIG. 2 in the foregoing embodiment for details, which are not described herein again. In addition, it should be noted that, the second antenna device may also determine, according to a detected RSSI and SINR, to perform frequency adjustment and/or antenna alignment, and reference may be made to the foregoing steps S504 to S506 for details, which are not described herein again.

Further, the first antenna device sends a preset adjustment time to the second antenna device, or receives a preset adjustment time sent by the second antenna device.

The preset adjustment time is used for indicating a time at which the first antenna device and the second antenna device start to perform frequency adjustment and/or antenna alignment.

Specifically, the preset adjustment time may be preset on the first antenna device, or may be preset on the second antenna device, and is sent to the other antenna device by using a negotiation message.

For example, at 07:00, the first antenna device determines, by detecting an RSSI, that the link is not out of synchronization, but determines, according to the RSSI and a corresponding SINR, to perform frequency adjustment and/or antenna alignment at 07:30 (that is, the preset adjustment time), and then the first antenna device sends the time (that is, 07:30) to the second antenna device, so that the second antenna device and the first antenna device simultaneously start to perform frequency adjustment and/or antenna alignment when 07:30 arrives. The foregoing description is merely exemplary, and sets no limitation.

In addition, the negotiation message may further include an adjustment manner, where the adjustment manner includes frequency adjustment and/or antenna alignment. The first antenna device sends a determined adjustment manner to the second antenna device, and the first antenna device and the second antenna device perform frequency adjustment and/or antenna alignment according to the adjustment manner after the preset adjustment time arrives.

S507: The first antenna device performs frequency adjustment with the second antenna device.

Specifically, the first antenna device uses, within a first pre-determined time, a first frequency in the preset frequency adjustment set as an antenna frequency corresponding to the first antenna device; detects a first RSSI of the link, and when it is determined that the first RSSI is greater than or equal to the first RSSI threshold, detects a first SINR of the link; and after it is determined, according to the first RSSI and the first SINR, that the first frequency is not a working frequency of an antenna corresponding to the first antenna device, if the first pre-determined time arrives, uses, within a first pre-determined time, a second frequency in the preset frequency adjustment set as the antenna frequency corresponding to the first antenna device.

When it is determined that the first RSSI is less than the first RSSI threshold, the first antenna device determines that the first frequency is not the working frequency of the antenna corresponding to the first antenna device; or when it is determined that the first RSSI is greater than or equal to the first RSSI threshold and the first SINR is less than the SINR preset threshold, the first antenna device determines that the first frequency is not the working frequency of the antenna corresponding to the first antenna device.

Similarly, the second antenna device uses, within a third pre-determined time, the first frequency in the preset frequency adjustment set as the antenna frequency corresponding to the second antenna device; detects an RSSI of the link, and when it is determined that the RSSI is greater than or equal to the first RSSI threshold, detects an SINR of the link; and after it is determined, according to the RSSI and the SINR, that the first frequency is not a working frequency of an antenna corresponding to the second antenna device, if the third pre-determined time arrives, uses, within a third pre-determined time, the second frequency in the preset frequency adjustment set as the working frequency of the antenna corresponding to the second antenna device.

In a possible implementation manner of the present invention, the first pre-determined time is greater than or equal to a product of the third pre-determined time and a quantity of frequencies in the preset frequency adjustment set, or the third pre-determined time is greater than or equal to a product of the first pre-determined time and a quantity of frequencies in the preset frequency adjustment set. In this embodiment of the present invention, a description is made by using an example in which the third pre-determined time is the product of the first pre-determined time and the quantity of the frequencies in the preset frequency adjustment set, which is not limited in the present invention.

Reference may be made to the description of FIG. 3 in the foregoing embodiment for details, which are not described herein again.

It should be noted that, in another possible implementation manner of the present invention, the first pre-determined time and the third pre-determined time may be the same. Exemplarily, the preset frequency adjustment set includes five adjustable frequencies F0 to F4, and when the first antenna device and the second antenna device determine, according to the preset adjustment time, to perform frequency adjustment, the first antenna device and the second antenna device each use the frequency F0 as a corresponding antenna frequency, and determine, according to a detected RSSI and SINR, whether the frequency F0 is a working frequency of a corresponding antenna. If it is determined that the frequency F0 is not the working frequency of the corresponding antenna, when the first pre-determined time and the third pre-determined time (the first pre-determined time and the third pre-determined time are the same) arrive at the first antenna device and the second antenna device, the first antenna device and the second antenna device simultaneously (the first pre-determined time and the third pre-determined time are the same) adjust the frequency F0 to F1, and determine, according to a detected RSSI and SINR, whether the frequency F0 is the working frequency of the corresponding antenna. If it is determined that the frequency F1 is not the working frequency of the corresponding antenna, the first antenna device and the second antenna device continue to simultaneously adjust the frequency F1 to F2 to F4 in sequence, until the working frequency of the corresponding antenna is determined according to a detected RSSI and SINR. In this way, it is ensured that an antenna frequency of the first antenna device keeps the same as an antenna frequency of the second antenna device (for example, the frequency of the first antenna device is F0 and the frequency of the second antenna device is F0), to perform detection, thereby improving frequency adjustment efficiency.

Further, after it is determined, according to the first RSSI and the first SINR, that the first frequency is the working frequency of the antenna corresponding to the first antenna device, the first antenna device sends a synchronization signal to the second antenna device, so that the second antenna device determines, according to the synchronization signal, that a current antenna frequency of the second antenna device is the working frequency of the antenna corresponding to the second antenna device.

Specifically, after it is determined that the first RSSI is greater than or equal to the first RSSI threshold and the first SINR is greater than or equal to the SINR preset threshold, the first antenna device determines that the first frequency is the working frequency of the antenna corresponding to the first antenna device.

Similarly, the second antenna device sends a synchronization signal to the first antenna device, so that the first antenna device determines, according to the synchronization signal, that a current frequency of the first antenna device is the working frequency of the antenna corresponding to the first antenna device.

In addition, when sequentially using, according to the first pre-determined time, the frequencies in the preset frequency adjustment set as the corresponding antenna frequency, the first antenna device may sequentially use, in order, the frequencies in the preset frequency adjustment set as the corresponding antenna frequency. For example, the first antenna device may sequentially use, in ascending order of transmit frequencies, the frequencies in the preset frequency adjustment set as the corresponding antenna frequency. Certainly, the first antenna device may sequentially use, in descending order, the frequencies in the preset frequency adjustment set as the corresponding antenna frequency, which is not limited in the present invention.

S508: The first antenna device performs antenna alignment with the second antenna device.

Specifically, the first antenna device uses, within a second pre-determined time, a first antenna angle in a preset antenna angle adjustment set as an antenna angle corresponding to the first antenna device; detects a second RSSI of the link, and when it is determined that the second RSSI is greater than or equal to the first RSSI threshold, detects a second SINR of the link; and after it is determined, according to the second RSSI and the second SINR, that the first antenna angle is not a working angle of an antenna corresponding to the first antenna device, if the second pre-determined time arrives, uses, within a second pre-determined time, a second antenna angle in the preset antenna angle adjustment set as the antenna angle corresponding to the first antenna device.

When it is determined that the second RSSI is less than the first RSSI threshold, the first antenna device determines that the first antenna angle is not the working angle of the antenna corresponding to the first antenna device; or when it is determined that the second RSSI is greater than or equal to the first RSSI threshold and is less than the second RSSI threshold, the first antenna device determines that the first antenna angle is not the working angle of the antenna corresponding to the first antenna device.

Similarly, the second antenna device uses, within a fourth pre-determined time, the first antenna angle in the preset antenna angle adjustment set as the antenna angle corresponding to the second antenna device; detects an RSSI of the link, and when it is determined that the RSSI is greater than or equal to the first RSSI threshold, detects an SINR of the link; and after it is determined, according to the RSSI and the SINR, that the first antenna angle is not a working angle of an antenna corresponding to the second antenna device, if the fourth pre-determined time arrives, uses, within a fourth pre-determined time, the second antenna angle in the preset antenna angle adjustment set as the working angle of the antenna corresponding to the second antenna device.

In a possible implementation manner of the present invention, the second pre-determined time is greater than or equal to a product of the fourth pre-determined time and the quantity of the antenna angles in the preset antenna angle adjustment set, or the fourth pre-determined time is greater than or equal to a product of the second pre-determined time and the quantity of the antenna angles in the preset antenna angle adjustment set. In this embodiment of the present invention, a description is made by using an example in which the fourth pre-determined time is the product of the second pre-determined time and the quantity of the antenna angles in the preset antenna angle adjustment set, which is not limited in the present invention.

Reference may be made to the description of FIG. 4 in the foregoing embodiment for details, which are not described herein again.

In another possible implementation manner of the present invention, the second pre-determined time and the fourth pre-determined time may be the same. Exemplarily, the preset antenna angle adjustment set includes five adjustable angles A0 to A4, and when the first antenna device and the second antenna device determine, according to the preset adjustment time, to perform antenna alignment, the first antenna device and the second antenna device each use the angle A0 as a corresponding antenna angle, and determine, according to a detected RSSI and SINR, whether the angle A0 is a working angle of a corresponding antenna. If it is determined that the angle A0 is not the working angle of the corresponding antenna, when the second pre-determined time and the fourth pre-determined time (the second pre-determined time and the fourth pre-determined time are the same) arrive at the first antenna device and the second antenna device, the first antenna device and the second antenna device simultaneously (the second pre-determined time and the fourth pre-determined time are the same) adjust the angle A0 to A1, and determine, according to a detected RSSI and SINR, whether the angle A0 is the working angle of the corresponding antenna. If it is determined that the angle A1 is not the working angle of the corresponding antenna, the first antenna device and the second antenna device continue to simultaneously adjust the angle A1 to A2 to A4 in sequence, until the working angle of the corresponding antenna is determined according to a detected RSSI and SINR. In this way, it is ensured that an antenna angle of the first antenna device keeps the same as an antenna angle of the second antenna device (for example, the angle of the first antenna device is A0 and the angle of the second antenna device is AU), to perform detection, thereby improving antenna alignment efficiency.

In addition, when sequentially using, according to the second pre-determined time, the antenna angles in the preset antenna angle adjustment set as the corresponding antenna angle, the first antenna device may sequentially use, in order, the antenna angles in the preset antenna angle adjustment set as the corresponding antenna angle. For example, the first antenna device may sequentially use, in ascending order of angles, the antenna angles in the preset antenna angle adjustment set as the corresponding antenna angle. Certainly, the first antenna device may sequentially use, in descending order, the antenna angles in the preset antenna angle adjustment set as the corresponding antenna angle, which is not limited in the present invention.

Further, after it is determined, according to the second RSSI and the second SINR, that the first antenna angle is the working angle of the antenna corresponding to the first antenna device, the first antenna device sends a synchronization signal to the second antenna device, so that the second antenna device determines, according to the synchronization signal, that a current antenna angle of the second antenna device is the working angle of the antenna corresponding to the second antenna device.

Specifically, when it is determined that the second RSSI is greater than or equal to the second RSSI threshold, the first antenna device determines that the first antenna angle is the working angle of the antenna corresponding to the first antenna device.

Similarly, the second antenna device sends a synchronization signal to the first antenna device, so that the first antenna device determines, according to the synchronization signal, that a current antenna angle of the first antenna device is the working angle of the antenna corresponding to the first antenna device.

S509: The first antenna device performs frequency adjustment and antenna alignment with the second antenna device.

Specifically, step S509 includes the following two implementation manners:

Manner 1: The first frequency adjustment device keeps an antenna angle and performs, based on the antenna angle, frequency adjustment with the second antenna device; after the frequency adjustment is completed, adjusts the antenna angle to another antenna angle in the preset antenna angle adjustment set and performs frequency adjustment with the second antenna device again; and if an antenna frequency corresponding to the first antenna device and an antenna frequency corresponding to the second antenna device are still not determined, continues to sequentially adjust the antenna angle corresponding to the first antenna device to the remaining angles in the preset antenna angle adjustment set and perform frequency adjustment, until the antenna frequency corresponding to the first antenna device and the antenna frequency corresponding to the second antenna device are determined.

Manner 2: The first frequency adjustment device keeps a corresponding antenna frequency and performs, based on the antenna frequency, antenna alignment with the second antenna device; after the antenna alignment is completed, adjusts the antenna frequency to another frequency in the preset frequency adjustment set and performs antenna alignment with the second antenna device again; and if a working frequency of the antenna corresponding to the first antenna device and a working frequency of the antenna corresponding to the second antenna device are still not determined, continues to sequentially adjust the antenna frequency corresponding to the first antenna device to the remaining frequencies in the preset frequency adjustment set and perform antenna alignment, until the working frequency of the antenna corresponding to the first antenna device and the working frequency of the antenna corresponding to the second antenna device are determined.

It can be seen from the foregoing that, a difference between Manner 1 and Manner 2 lies in that, in Manner 1, an antenna angle is kept first and then frequency adjustment is performed, and after the frequency adjustment, if a working frequency can still not be determined, the antenna angle is further adjusted; and in Manner 2, an antenna frequency is kept first and then antenna alignment is performed, and after the antenna alignment, if a working frequency can still not be determined, frequency adjustment is further performed.

It should be noted that, in normal communication, strong interference is more easily caused to signal transmission, and therefore, in an actual application, a solution in Manner 1 may be preferably used, to improve signal transmission quality faster.

According to the foregoing solution, a first antenna device and a second antenna device can determine, according to an RSSI and a corresponding SINR of a link, to perform frequency adjustment and/or antenna alignment, to implement link adaptation intelligently according to a current status of the link. No manual intervention is required, and labor costs are reduced in a case in which signal transmission quality is ensured.

It should be noted that, as for the foregoing method embodiments, for simple descriptions, the methods are described as a series of action combinations, but a person of ordinary skill in the art should learn that, the present invention is not limited by the described action orders, because according to the present invention, some steps may be performed in other orders or performed simultaneously. In addition, a person skilled in the art should also be aware that, the embodiments described in the specification are exemplary embodiments, and the involved actions and modules are not necessarily required by the present invention.

Figure 6:
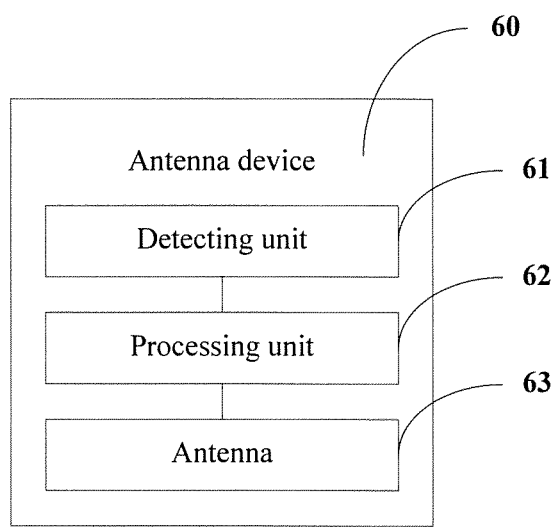
FIG. 6 is a schematic structural diagram of an antenna device according to an embodiment of the present invention.

An embodiment of the present invention provides an antenna device 60. As shown in FIG. 6, the antenna device 60 includes:

A detecting unit 61 is configured to detect a received signal strength indicator RSSI of a link between the antenna device and a second antenna device; and when it is determined that the RSSI is greater than or equal to a first RSSI threshold, detect a signal to interference plus noise ratio SINR of the link.

It should be noted that, when it is determined that the RSSI is greater than or equal to the first RSSI threshold, it indicates that the link is not out of synchronization, and the first antenna device and the second antenna device transmit a synchronization signal to each other. However, in a signal transmission process, interference may be caused to the link and affects signal transmission quality, and therefore, when it is determined that the RSSI is greater than or equal to the first RSSI threshold, the first antenna device may further acquire an SINR according to a received signal transmitted in the link, where the received signal may be the foregoing synchronization signal, and the first antenna device performs frequency adjustment and/or antenna alignment with the second antenna device according to the RSSI and the SINR.

A processing unit 62 is configured to choose, according to the RSSI and the SINR that are detected by the detecting unit 61, to perform frequency adjustment and/or antenna alignment with the second antenna device.

An antenna 63 is configured to perform signal transmission with the second antenna device.

Optionally, the processing unit 62 is specifically configured to: when it is determined that the RSSI is greater than or equal to a second RSSI threshold and the SINR is less than an SINR preset threshold, choose to perform frequency adjustment with the second antenna device, where the second RSSI threshold is greater than the first RSSI threshold.

Optionally, the processing unit 62 is specifically configured to: when it is determined that the RSSI is less than a second RSSI threshold and the SINR is greater than or equal to an SINR preset threshold, choose to perform antenna alignment with the second antenna device.

Optionally, the processing unit 62 is specifically configured to: when it is determined that the RSSI is less than a second RSSI threshold and the SINR is less than an SINR preset threshold, choose to perform frequency adjustment and antenna alignment with the second antenna device.

Optionally, the antenna 63 is specifically configured to send a preset adjustment time to the second antenna device; or receive a preset adjustment time sent by the second antenna device.

The preset adjustment time is used for indicating a time at which the first antenna device and the second antenna device start to perform frequency adjustment and/or antenna alignment.

Specifically, the preset adjustment time may be preset on the first antenna device, or may be preset on the second antenna device, and is sent to the other antenna device by using a negotiation message.

For example, at 07:00, the first antenna device determines, by detecting an RSSI, that the link is not out of synchronization, but determines, according to the RSSI and a corresponding SINR, to perform frequency adjustment and/or antenna alignment at 07:30 (that is, the preset adjustment time), and then the first antenna device sends the time (that is, 07:30) to the second antenna device, so that the second antenna device and the first antenna device simultaneously start to perform frequency adjustment and/or antenna alignment when 07:30 arrives. The foregoing description is merely exemplary, and sets no limitation.

In addition, the negotiation message may further include an adjustment manner, where the adjustment manner includes frequency adjustment and/or antenna alignment. The first antenna device sends a determined adjustment manner to the second antenna device, and the first antenna device and the second antenna device perform frequency adjustment and/or antenna alignment according to the adjustment manner after the preset adjustment time arrives.

Specifically, if the first antenna device determines to perform frequency adjustment, the first antenna device sends the preset adjustment time and an adjustment manner (that is, frequency adjustment) to the second antenna device, and the first antenna device and the second antenna device perform frequency adjustment after the preset adjustment time arrives.

If the first antenna device determines to perform antenna alignment, the first antenna device sends the preset adjustment time and an adjustment manner (that is, antenna alignment) to the second antenna device, and the first antenna device and the second antenna device perform antenna alignment after the preset adjustment time arrives.

If the first antenna device determines to perform frequency adjustment and antenna alignment, the first antenna device sends the preset adjustment time and an adjustment manner (that is, frequency adjustment and antenna alignment) to the second antenna device, and the first antenna device and the second antenna device perform frequency adjustment and antenna alignment after the preset adjustment time arrives.

Optionally, the processing unit 62 is further configured to: when it is determined that the RSSI is less than the first RSSI threshold, choose to perform frequency adjustment and antenna alignment with the second antenna device.

It should be noted that, when the first antenna device determines that the RSSI is less than the first RSSI threshold, that is, determines that the link between the first antenna device and the second antenna device is out of synchronization, the first antenna device stops sending a signal to the second antenna device, where the signal may be a synchronization signal indicating link synchronization. Similarly, the second antenna device determines, by detecting an RSSI of the link between the second antenna device and the first antenna device, that the link is out of synchronization, and then, the first antenna device and the second antenna device perform frequency adjustment and antenna alignment, so that the link between the first antenna device and the second antenna device recovers synchronization.

Further, when performing frequency adjustment, the processing unit is specifically configured to determine an antenna angle from a preset antenna angle adjustment set; and maintain the antenna angle, and perform frequency adjustment with the second frequency adjustment device.

The processing unit 62 is specifically configured to use, within a first pre-determined time, a first frequency in the preset frequency adjustment set as an antenna frequency corresponding to the first antenna device; detect a first RSSI of the link, and when it is determined that the first RSSI is greater than or equal to the first RSSI threshold, detect a first SINR of the link; and after it is determined, according to the first RSSI and the first SINR, that the first frequency is not a working frequency of the antenna corresponding to the first antenna device, if the first pre-determined time arrives, use, within a first pre-determined time, a second frequency in the preset frequency adjustment set as the antenna frequency corresponding to the first antenna device.

The processing unit 62 is specifically configured to: when it is determined that the first RSSI is less than the first RSSI threshold, determine that the first frequency is not the working frequency of the antenna corresponding to the first antenna device; or when it is determined that the first RSSI is greater than or equal to the first RSSI threshold and the first SINR is less than the SINR preset threshold, determine that the first frequency is not the working frequency of the antenna corresponding to the first antenna device.

The antenna 63 is further configured to: after the processing unit 62 determines, according to the first RSSI and the first SINR, that the first frequency is the working frequency of the antenna corresponding to the first antenna device, send a synchronization signal to the second antenna device, so that the second antenna device determines, according to the synchronization signal, that a current antenna frequency of the second antenna device is a working frequency of an antenna corresponding to the second antenna device.

The processing unit 62 is specifically configured to: when it is determined that the first RSSI is greater than or equal to the first RSSI threshold and the first SINR is greater than or equal to the SINR preset threshold, determine that the first frequency is the working frequency of the antenna corresponding to the first antenna device.

Specifically, the first antenna device uses, within a first pre-determined time, the first frequency in the preset frequency adjustment set as the antenna frequency corresponding to the first antenna device; detects a first RSSI of the link, and when it is determined that the first RSSI is greater than or equal to the first RSSI threshold, detects a first SINR of the link; and after it is determined, according to the first RSSI and the first SINR, that the first frequency is not the working frequency of the antenna corresponding to the first antenna device, if the first pre-determined time arrives, uses, within a first pre-determined time, the second frequency in the preset frequency adjustment set as the antenna frequency corresponding to the first antenna device.

When it is determined that the first RSSI is less than the first RSSI threshold, the first antenna device determines that the first frequency is not the working frequency of the antenna corresponding to the first antenna device; or when it is determined that the first RSSI is greater than or equal to the first RSSI threshold and the first SINR is less than the SINR preset threshold, the first antenna device determines that the first frequency is not the working frequency of the antenna corresponding to the first antenna device.

Similarly, the second antenna device uses, within a third pre-determined time, the first frequency in the preset frequency adjustment set as the antenna frequency corresponding to the second antenna device; detects an RSSI of the link, and when it is determined that the RSSI is greater than or equal to the first RSSI threshold, detects an SINR of the link; and after it is determined, according to the RSSI and the SINR, that the first frequency is not the working frequency of the antenna corresponding to the second antenna device, if the third pre-determined time arrives, uses, within a third pre-determined time, the second frequency in the preset frequency adjustment set as the working frequency of the antenna corresponding to the second antenna device.

In a possible implementation manner of the present invention, the first pre-determined time is greater than or equal to a product of the third pre-determined time and a quantity of frequencies in the preset frequency adjustment set, or the third pre-determined time is greater than or equal to a product of the first pre-determined time and a quantity of frequencies in the preset frequency adjustment set. In this embodiment of the present invention, a description is made by using an example in which the third pre-determined time is the product of the first pre-determined time and the quantity of the frequencies in the preset frequency adjustment set, which is not limited in the present invention.

Reference may be made to the description of FIG. 3 in the foregoing embodiment for details, which are not described herein again.

It should be noted that, in another possible implementation manner of the present invention, the first pre-determined time and the third pre-determined time may be the same. Exemplarily, the preset frequency adjustment set includes five adjustable frequencies F0 to F4, and when the first antenna device and the second antenna device determine, according to the preset adjustment time, to perform frequency adjustment, the first antenna device and the second antenna device each use the frequency F0 as a corresponding antenna frequency, and determine, according to a detected RSSI and SINR, whether the frequency F0 is a working frequency of a corresponding antenna. If it is determined that the frequency F0 is not the working frequency of the corresponding antenna, when the first pre-determined time and the third pre-determined time (the first pre-determined time and the third pre-determined time are the same) arrive at the first antenna device and the second antenna device, the first antenna device and the second antenna device simultaneously (the first pre-determined time and the third pre-determined time are the same) adjust the frequency F0 to F1, and determine, according to a detected RSSI and SINR, whether the frequency F0 is the working frequency of the corresponding antenna. If it is determined that the frequency F1 is not the working frequency of the corresponding antenna, the first antenna device and the second antenna device continue to simultaneously adjust the frequency F1 to F2 to F4 in sequence, until the working frequency of the corresponding antenna is determined according to a detected RSSI and SINR. In this way, it is ensured that an antenna frequency of the first antenna device keeps the same as an antenna frequency of the second antenna device (for example, the frequency of the first antenna device is F0 and the frequency of the second antenna device is F0), to perform detection, thereby improving frequency adjustment efficiency.

In addition, when sequentially using, according to the first pre-determined time, the frequencies in the preset frequency adjustment set as the corresponding antenna frequency, the first antenna device may sequentially use, in order, the frequencies in the preset frequency adjustment set as the corresponding antenna frequency. For example, the first antenna device may sequentially use, in ascending order of transmit frequencies, the frequencies in the preset frequency adjustment set as the corresponding antenna frequency. Certainly, the first antenna device may sequentially use, in descending order, the frequencies in the preset frequency adjustment set as the corresponding antenna frequency, which is not limited in the present invention.

Further, when performing antenna alignment, the processing unit 62 is specifically configured to determine an antenna frequency from the preset frequency adjustment set; and maintain the antenna frequency, and perform antenna alignment with the second frequency adjustment device.

Specifically, the processing unit 62 is specifically configured to use, within a second pre-determined time, a first antenna angle in the preset antenna angle adjustment set as an antenna angle corresponding to the first antenna device; detect a second RSSI of the link, and when it is determined that the second RSSI is greater than or equal to the first RSSI threshold, detect a second SINR of the link; and after it is determined, according to the second RSSI and the second SINR, that the first antenna angle is not a working angle of the antenna corresponding to the first antenna device, if the second pre-determined time arrives, use, within a second pre-determined time, a second antenna angle in the preset antenna angle adjustment set as the antenna angle corresponding to the first antenna device.

The processing unit 62 is specifically configured to: when it is determined that the second RSSI is less than the first RSSI threshold, determine that the first antenna angle is not the working angle of the antenna corresponding to the first antenna device; or when it is determined that the second RSSI is greater than or equal to the first RSSI threshold and is less than the second RSSI threshold, determine that the first antenna angle is not the working angle of the antenna corresponding to the first antenna device.

The antenna 63 is further configured to: after it is determined, according to the second RSSI and the second SINR, that the first antenna angle is the working angle of the antenna corresponding to the first antenna device, send a synchronization signal to the second antenna device, so that the second antenna device determines, according to the synchronization signal, that a current antenna angle of the second antenna device is a working angle of the antenna corresponding to the second antenna device.

The processing unit 62 is specifically configured to: when it is determined that the second RSSI is greater than or equal to the second RSSI threshold, determine that the first antenna angle is the working angle of the antenna corresponding to the first antenna device.

Specifically, the first antenna device uses, within a second pre-determined time, the first antenna angle in the preset antenna angle adjustment set as the antenna angle corresponding to the first antenna device; detects a second RSSI of the link, and when it is determined that the second RSSI is greater than or equal to the first RSSI threshold, detects a second SINR of the link; and after it is determined, according to the second RSSI and the second SINR, that the first antenna angle is not the working angle of the antenna corresponding to the first antenna device, if the second pre-determined time arrives, uses, within a second pre-determined time, the second antenna angle in the preset antenna angle adjustment set as the antenna angle corresponding to the first antenna device.

When it is determined that the second RSSI is less than the first RSSI threshold, the first antenna device determines that the first antenna angle is not the working angle of the antenna corresponding to the first antenna device; or when it is determined that the second RSSI is greater than or equal to the first RSSI threshold and is less than the second RSSI threshold, the first antenna device determines that the first antenna angle is not the working angle of the antenna corresponding to the first antenna device.

Similarly, the second antenna device uses, within a fourth pre-determined time, the first antenna angle in the preset antenna angle adjustment set as the antenna angle corresponding to the second antenna device; detects an RSSI of the link, and when it is determined that the RSSI is greater than or equal to the first RSSI threshold, detects an SINR of the link; and after it is determined, according to the RSSI and the SINR, that the first antenna angle is not the working angle of the antenna corresponding to the second antenna device, if the fourth pre-determined time arrives, uses, within a fourth pre-determined time, the second antenna angle in the preset antenna angle adjustment set as the working angle of the antenna corresponding to the second antenna device.

In a possible implementation manner of the present invention, the second pre-determined time is greater than or equal to a product of the fourth pre-determined time and the quantity of the antenna angles in the preset antenna angle adjustment set, or the fourth pre-determined time is greater than or equal to a product of the second pre-determined time and the quantity of the antenna angles in the preset antenna angle adjustment set. In this embodiment of the present invention, a description is made by using an example in which the fourth pre-determined time is the product of the second pre-determined time and the quantity of the antenna angles in the preset antenna angle adjustment set, which is not limited in the present invention.

Reference may be made to the description of FIG. 4 in the foregoing embodiment for details, which are not described herein again.

In another possible implementation manner of the present invention, the second pre-determined time and the fourth pre-determined time may be the same. Exemplarily, the preset antenna angle adjustment set includes five adjustable angles A0 to A4, and when the first antenna device and the second antenna device determine, according to the preset adjustment time, to perform antenna alignment, the first antenna device and the second antenna device each use the angle A0 as a corresponding antenna angle, and determine, according to a detected RSSI and SINR, whether the angle A0 is a working angle of a corresponding antenna. If it is determined that the angle A0 is not the working angle of the corresponding antenna, when the second pre-determined time and the fourth pre-determined time (the second pre-determined time and the fourth pre-determined time are the same) arrive at the first antenna device and the second antenna device, the first antenna device and the second antenna device simultaneously (the second pre-determined time and the fourth pre-determined time are the same) adjust the angle A0 to A1, and determine, according to a detected RSSI and SINR, whether the angle A0 is the working angle of the corresponding antenna. If it is determined that the angle A1 is not the working angle of the corresponding antenna, the first antenna device and the second antenna device continue to simultaneously adjust the angle A1 to A2 to A4 in sequence, until the working angle of the corresponding antenna is determined according to a detected RSSI and SINR. In this way, it is ensured that an antenna angle of the first antenna device keeps the same as an antenna angle of the second antenna device (for example, the angle of the first antenna device is A0 and the angle of the second antenna device is AU), to perform detection, thereby improving antenna alignment efficiency.

In addition, when sequentially using, according to the second pre-determined time, the antenna angles in the preset antenna angle adjustment set as the corresponding antenna angle, the first antenna device may sequentially use, in order, the antenna angles in the preset antenna angle adjustment set as the corresponding antenna angle. For example, the first antenna device may sequentially use, in ascending order of angles, the antenna angles in the preset antenna angle adjustment set as the corresponding antenna angle. Certainly, the first antenna device may sequentially use, in descending order, the antenna angles in the preset antenna angle adjustment set as the corresponding antenna angle, which is not limited in the present invention.

It should be noted that, the antenna device may be a backhaul remote end or a backhaul local end, which is not limited in the present invention.

According to the antenna device, the antenna device can determine, according to an RSSI and a corresponding SINR of a link, to perform frequency adjustment and/or antenna alignment, to implement link adaptation intelligently according to a current status of the link. No manual intervention is required, and labor costs are reduced in a case in which signal transmission quality is ensured.

A person skilled in the art may clearly understand that, for the purpose of a convenient and brief description, for a detailed working process and description of the antenna device described above, reference may be made to a corresponding process in the method embodiments, and details are not described herein again.

Figure 7:
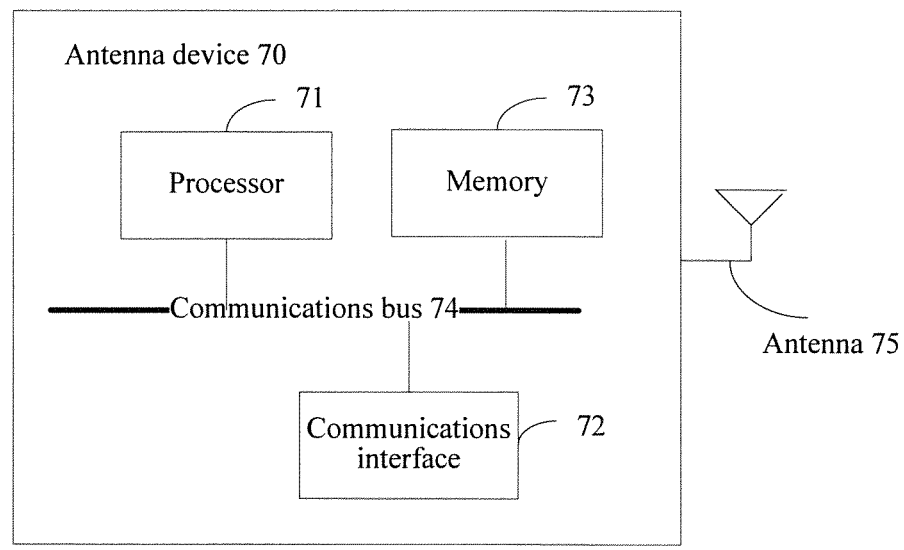
FIG. 7 is a schematic structural diagram of another antenna device according to an embodiment of the present invention.

An embodiment of the present invention provides an antenna device 70. As shown in FIG. 7, the device 70 includes:

a processor (processor) 71, a communications interface (Communications Interface) 72, a memory (memory) 73, a communications bus 74, and an antenna 75, where the processor 71, the communications interface 72, and the memory 73 communicate with each other by using the communications bus 74.

The processor 71 may be a central processing unit CPU, or an application specific integrated circuit ASIC (Application Specific Integrated Circuit), or be configured as one or more integrated circuits for implementing the embodiments of the present invention.

The memory 73 is configured to store program code, where the program code includes a computer operation instruction. The memory 73 may include a high-speed RAM memory, or may include a non-volatile memory (non-volatile memory), for example, at least one magnetic disk memory.

The communications interface 72 is configured to implement connection and communication between these components.

The antenna 75 is configured to perform signal transmission with a second antenna device.

The processor 71 executes the program code, to detect a received signal strength indicator RSSI of a link between the antenna device and the second antenna device; when it is determined that the RSSI is greater than or equal to a first RSSI threshold, detect a signal to interference plus noise ratio SINR of the link; and choose, according to the RSSI and the SINR, to perform frequency adjustment and/or antenna alignment with the second antenna device.

Optionally, the processor 71 is specifically configured to: when it is determined that the RSSI is greater than or equal to a second RSSI threshold and the SINR is less than an SINR preset threshold, choose to perform frequency adjustment with the second antenna device, where the second RSSI threshold is greater than the first RSSI threshold.

Optionally, the processor 71 is specifically configured to: when it is determined that the RSSI is less than a second RSSI threshold and the SINR is greater than or equal to an SINR preset threshold, choose to perform antenna alignment with the second antenna device, where the second RSSI threshold is greater than the first RSSI threshold.

Optionally, the processor 71 is specifically configured to: when it is determined that the RSSI is less than a second RSSI threshold and the SINR is less than an SINR preset threshold, choose to perform frequency adjustment and antenna alignment with the second antenna device, where the second RSSI threshold is greater than the first RSSI threshold.

Optionally, the processor 71 is further configured to send a preset adjustment time to the second antenna device; or receive a preset adjustment time sent by the second antenna device, where the preset adjustment time is used for indicating a time at which the first antenna device and the second antenna device start to perform frequency adjustment and/or antenna alignment.

Optionally, the processor 71 is further configured to: when it is determined that the RSSI is less than the first RSSI threshold, choose to perform frequency adjustment and antenna alignment with the second antenna device.

Optionally, the processor 71 is further configured to determine an antenna angle from a preset antenna angle adjustment set; and maintain the antenna angle, and perform frequency adjustment with the second frequency adjustment device; and determine an antenna frequency from a preset frequency adjustment set; and maintain the antenna frequency, and perform antenna alignment with the second frequency adjustment device.

Optionally, the processor 71 is specifically configured to use, within a first pre-determined time, a first frequency in the preset frequency adjustment set as an antenna frequency corresponding to the first antenna device; detect a first RSSI of the link, and when it is determined that the first RSSI is greater than or equal to the first RSSI threshold, detect a first SINR of the link; and after it is determined, according to the first RSSI and the first SINR, that the first frequency is not a working frequency of the antenna corresponding to the first antenna device, if the first pre-determined time arrives, use, within a first pre-determined time, a second frequency in the preset frequency adjustment set as the antenna frequency corresponding to the first antenna device.

Optionally, the processor 71 is further configured to: after it is determined, according to the first RSSI and the first SINR, that the first frequency is the working frequency of the antenna corresponding to the first antenna device, send a synchronization signal to the second antenna device, so that the second antenna device determines, according to the synchronization signal, that a current antenna frequency of the second antenna device is a working frequency of an antenna corresponding to the second antenna device.

Optionally, the processor 71 is specifically configured to: when it is determined that the first RSSI is less than the first RSSI threshold, determine that the first frequency is not the working frequency of the antenna corresponding to the first antenna device; or when it is determined that the first RSSI is greater than or equal to the first RSSI threshold and the first SINR is less than the SINR preset threshold, determine that the first frequency is not the working frequency of the antenna corresponding to the first antenna device; and the processor 71 is specifically configured to: when it is determined that the first RSSI is greater than or equal to the first RSSI threshold and the first SINR is greater than or equal to the SINR preset threshold, determine that the first frequency is the working frequency of the antenna corresponding to the first antenna device.

Optionally, the processor 71 is specifically configured to use, within a second pre-determined time, a first antenna angle in the preset antenna angle adjustment set as an antenna angle corresponding to the first antenna device; detect a second RSSI of the link, and when it is determined that the second RSSI is greater than or equal to the first RSSI threshold, detect a second SINR of the link; and after it is determined, according to the second RSSI and the second SINR, that the first antenna angle is not a working angle of the antenna corresponding to the first antenna device, if the second pre-determined time arrives, use, within a second pre-determined time, a second antenna angle in the preset antenna angle adjustment set as the antenna angle corresponding to the first antenna device.

Optionally, the processor 71 is further configured to: after it is determined, according to the second RSSI and the second SINR, that the first antenna angle is the working angle of the antenna corresponding to the first antenna device, send a synchronization signal to the second antenna device, so that the second antenna device determines, according to the synchronization signal, that a current antenna angle of the second antenna device is a working angle of an antenna corresponding to the second antenna device.

Optionally, the processor 71 is further configured to: when it is determined that the second RSSI is less than the first RSSI threshold, determine that the first antenna angle is not the working angle of the antenna corresponding to the first antenna device; or when it is determined that the second RSSI is greater than or equal to the first RSSI threshold and is less than the second RSSI threshold, determine that the first antenna angle is not the working angle of the antenna corresponding to the first antenna device; and the processor 71 is further configured to: when it is determined that the second RSSI is greater than or equal to the second RSSI threshold, determine that the first antenna angle is the working angle of the antenna corresponding to the first antenna device.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A link adaptation method, comprising:
receiving, by a first wireless device, a signal transmitted over a link between the first wireless device and a second wireless device;
detecting, by the first wireless device, a received signal strength indicator (RSSI);
detecting, by the first wireless device, a signal to interference plus noise ratio (SINR) in a case that a detected RSSI is greater than or equal to a RSSI threshold;
sending, by the first wireless device, an indication to the second wireless device in a case that a detected SINR is greater than or equal to a SINR threshold, wherein the indication indicates that a configuration for the transmission of the signal is adapted to the link between the first wireless device and the second wireless device.

2. The method according to claim 1, wherein the configuration comprises at least one of an antenna frequency and an antenna angle for the transmission of the signal.

3. The method according to claim 1, further comprising:
performing, by the first wireless device, an antenna alignment with the second wireless device in a case that a detected RSSI is less than the RSSI threshold.

4. The method according to claim 3, wherein performing, by the first wireless device, antenna alignment with the second wireless device, comprises:
selecting, by the first wireless device from an antenna angle set, an antenna angle that enables a detected RSSI is greater than or equal to the RSSI threshold; and
determining, by the first wireless device, that antenna angle is adapted to the link between the first wireless device and the second wireless device.

5. The method according to claim 3, further comprising:
sending, by the first wireless device, a negotiation message to the second wireless device, wherein the negotiation message comprises parameters for the antenna alignment.

6. The method according to claim 1, further comprising:
performing, by the first wireless device, a frequency adjustment with the second wireless device in a case that a detected SINR is less than the SINR threshold.

7. The method according to claim 6, wherein performing, by the first wireless device, a frequency adjustment with the second wireless device, comprises:
selecting, by the first wireless device from a frequency adjustment set, an antenna frequency that enables a detected SINR is greater than or equal to the SINR threshold; and
determining, by the first wireless device, that the antenna frequency is adapted to the link between the first wireless device and the second wireless device.

8. A wireless device, comprising:
a processor; and
a non-transitory computer-readable storage medium coupled to the processor and storing programming instructions for execution by the processor, the programming instructions instruct the processor to:
receive a signal transmitted over a link between the wireless device and another wireless device,
detect a received signal strength indicator (RSSI),
detect a signal to interference plus noise ratio (SINR) in a case that a detected RSSI is greater than or equal to a RSSI threshold, and
send an indication to the second wireless device in a case that a detected SINR is greater than or equal to a SINR threshold, wherein the indication indicates that a configuration for the transmission of the signal is adapted to the link between the wireless device and the another wireless device.

9. The device according to claim 8, wherein the configuration comprises at least one of an antenna frequency and an antenna angle for the transmission of the signal.

10. The device according to claim 8, wherein the programming instructions further instruct the processor to:
perform an antenna alignment with the another wireless device in a case that a detected RSSI is less than the RSSI threshold.

11. The device according to claim 10, wherein the programming instructions further instruct the processor to:
select from an antenna angle set, an antenna angle that enables a detected RSSI is greater than or equal to the RSSI threshold; and
determine that antenna angle is adapted to the link between the wireless device and the another wireless device.

12. The device according to claim 10, wherein the programming instructions further instruct the processor to:
send a negotiation message to the another wireless device, wherein the negotiation message comprises parameters for the antenna alignment.

13. The device according to claim 8, wherein the programming instructions further instruct the processor to:
perform a frequency adjustment with the another wireless device in a case that a detected SINR is less than the SINR threshold.

14. The device according to claim 13, wherein the programming instructions further instruct the processor to:
select from a frequency adjustment set, an antenna frequency that enables a detected SINR is greater than or equal to the SINR threshold; and
determine that the antenna frequency is adapted to the link between the wireless device and the another wireless device.

* * * * *